United States Patent
Wang et al.

[19]

[11] Patent Number: 5,813,081
[45] Date of Patent: Sep. 29, 1998

[54] CIRCULAR DEVICE FOR CLEANING THE ENDS OF OPTICAL FIBERS

[75] Inventors: Bo Wang, Greer, S.C.; Ronald Peek, Pleasanton, Calif.

[73] Assignee: Alcoa Fujikura Limited, Brentwood, Tenn.

[21] Appl. No.: 833,361

[22] Filed: Apr. 4, 1997

[51] Int. Cl.⁶ ..................................................... B24B 13/00
[52] U.S. Cl. ........................... 15/210.1; 15/220.4; 451/41
[58] Field of Search ................................. 15/97.1, 210.1, 15/220.4; 451/41, 384, 555

[56] References Cited

U.S. PATENT DOCUMENTS

| | | | |
|---|---|---|---|
| 2,992,446 | 7/1961 | Wise | ......................................... 15/97.1 |
| 4,065,798 | 12/1977 | Sugisaki | ................................... 15/210.1 |
| 4,506,402 | 3/1985 | Long, Jr. | .................................. 15/220.4 |
| 4,713,856 | 12/1987 | Clausen . | |
| 4,750,231 | 6/1988 | Kogashiwa . | |
| 5,117,528 | 6/1992 | Kanayama et al. . | |
| 5,375,285 | 12/1994 | Miura et al. . | |
| 5,438,725 | 8/1995 | Okada et al. . | |
| 5,503,590 | 4/1996 | Saitoh et al. . | |

*Primary Examiner*—Randall E. Chin
*Attorney, Agent, or Firm*—Elroy Strickland; Tracy D. Beiriger

[57] ABSTRACT

A circular layer of cleaning material is located on a circular elastomer pad located in a circular container. The layer of cleaning material has a surface capable of cleaning an exposed end of an optical fiber when the fiber end is rubbed against the surface of the layer. The circular container includes a base and cover that are relatively manually rotatable when assembled together, and the lid is provided with an opening for receiving the end of the optical fiber.

5 Claims, 3 Drawing Sheets

CIRCULAR DEVICE FOR CLEANING THE ENDS OF OPTICAL FIBERS

BACKGROUND OF THE INVENTION

The present invention relates generally to cleaning the ends of optical fiber connectors that have been subject to handling in one fashion or another, and particularly to a compact, hand-held, inexpensive, portable device for quickly cleaning an exposed end of an optical fiber connector.

U.S. Pat. No. 5,117,528 to Kanayma et al discloses two primary devices for cleaning the ends of an optical fiber connector. In one embodiment, a cassette type housing contains a tape of a cleaning cloth wound on take-up and payoff spools. The spools are rotated to translate the cloth tape in the cassette housing. A second embodiment in the patent comprises a flat rectangular or square device containing a cleaning cloth in the form of a disc. The disc is exposed at one side of the rectangular device for manual movement of the disc. The housing comprises a sandwich of two flat rectangular plates located on each side of the cleaning cloth (disc), with the plates and cloth being held together by a center threaded shaft and nut about which the cleaning cloth is rotated. A narrow slotted opening is provided in one of the rectangular pieces for insertion of an end of the optical fiber to be cleaned.

BRIEF SUMMARY OF THE INVENTION

The present invention provides a circular compact housing comprised of a circular lid and a base, the two being relatively rotatable after the lid and base are placed together. In the base is located a circular elastomer pad on which a circular cleaning cloth is located. A slotted opening is provided in the lid for receiving an end of an optical fiber for cleaning. Cleaning is effected by moving the fiber in the slotted opening as the fiber end is pressed against the cleaning cloth.

As the ends of fibers are cleaned, the area of the cloth beneath the slotted opening in the lid becomes soiled. The soiled area does not provide effective cleaning of fiber ends, i.e., a clean unsoiled area is needed. To provide such an area the user of the device simply moves a new clean area of the cloth into a position beneath the slotted opening by relatively rotating the lid and base.

In addition, the lid and base can be indexed to indicate when the cloth needs to be replaced, i.e., as the user manually relatively rotates the lid and base, index numerals located on the side of the lid and base indicate the extent of its use. When the relative movement has progressed 360°, the user will then know that the cloth in the container requires replacement. With this knowledge, the user simply separates the lid from the base, removes the cloth and inserts a new one. The user then snaps the lid and base together for further use of the device.

The subject device is inexpensive to make in that the lid and base can be simple plastic components molded respectively with a ledge and slot that will allow them to be easily snapped together (and separated when the cleaning cloth requires replacement).

BRIEF DESCRIPTION OF THE DRAWINGS

The objectives and advantages of the subject invention will be better understood from consideration of the following detailed description and the accompanying drawing of which.

PREFERRED EMBODIMENT

Figure 1:
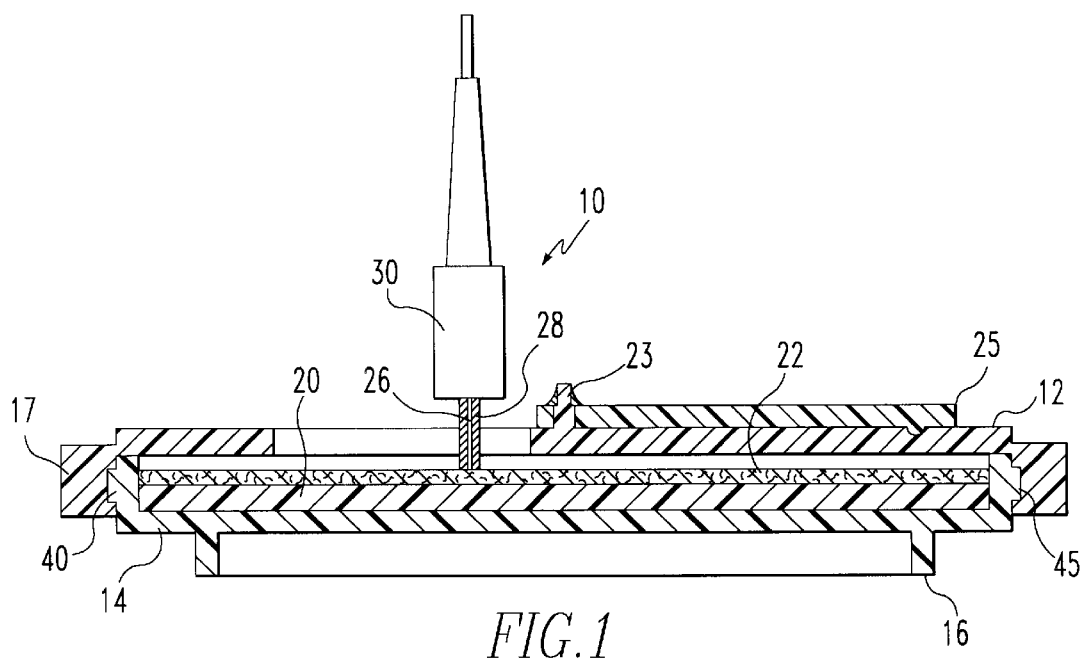
FIG. 1 is a section view of the cleaning device of the invention.

Referring now in detail to FIG. 1 of the drawings, a compact, inexpensive optical fiber cleaning device and container 10 is shown in which a circular lid or cover 12 is disposed on a circular base 14 in a manner that allows relative manual movement of lid and base when the hands of a user grasp the lid and base, and relatively rotates the same. The relative diameters of the lid and base are such that they can be assembled and held together by a suitable mechanism, as discussed in detail hereinafter. The material of the lid and base can be that suitable for injection molding, though other materials and manufacturing methods can be used.

The lower surface of base 14 is shown provided with an integral circular extension 16 that fits into the hand of the user. This allows an easy grasp of the device, and indexing marks 15 and 18 can be provided respectively on the base and cover for purposes discussed hereinafter.

The lid can further be provided with opposed extensions or tabs 17 that permit the user to engage the same with a finger or thumb to rotate the lid relative to the base.

Contained in base 14 is a circular elastomer cushion or pad 20 having a diameter substantially equal to that of the inside diameter of base 14 so that cushion 20 is firmly held in the base.

Pad 20 has an upwardly facing, exposed surface (see FIG. 1) upon which a circular layer of a cleaning material 22 is located, the diameter of which, like that of pad 20, is substantially equal to the inside diameter of base 14. The material of 22 can be a cross woven polyester though other suitable materials and cloths are available and can be used.

Figure 2:
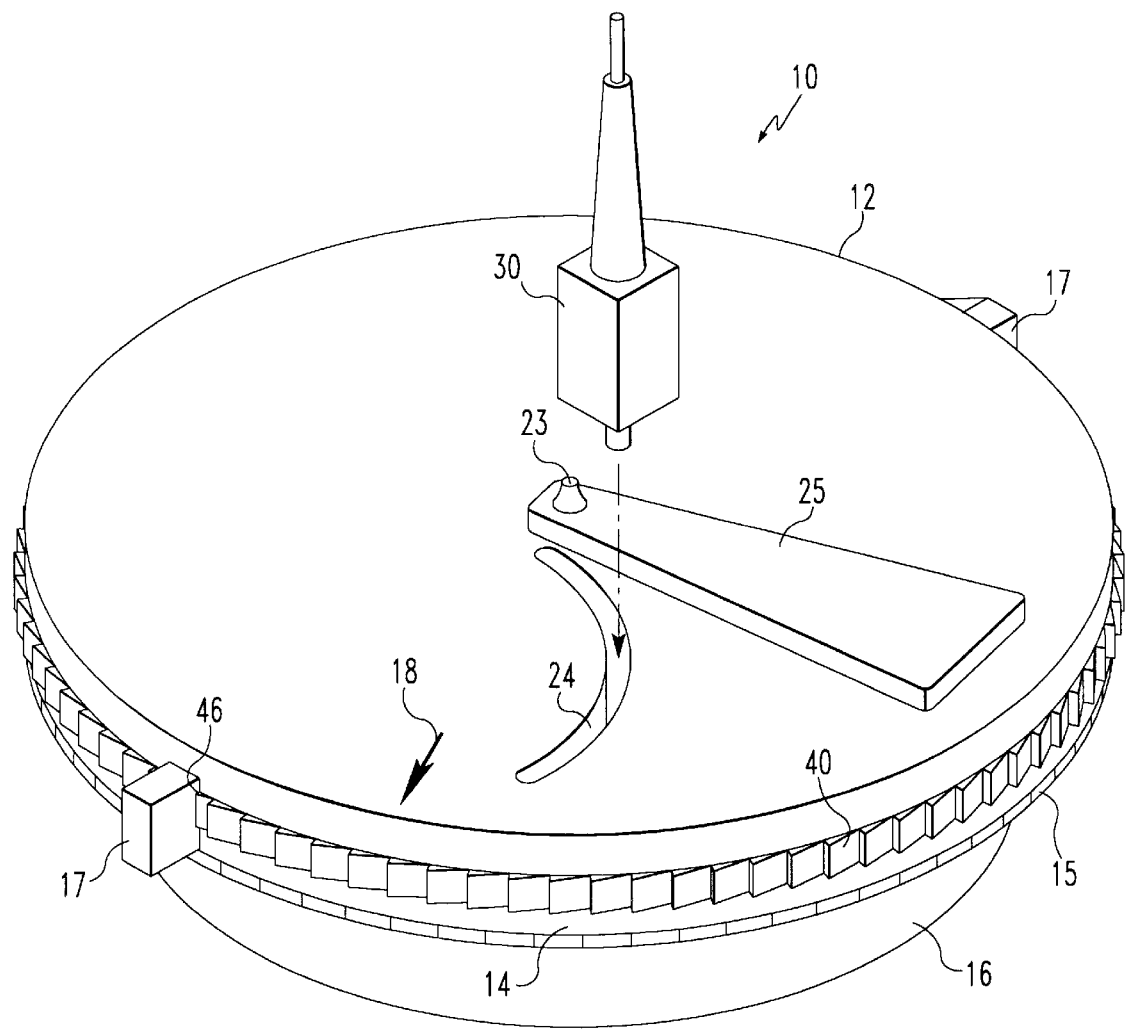
FIG. 2 is an isometric view of the device.
Figure 4:
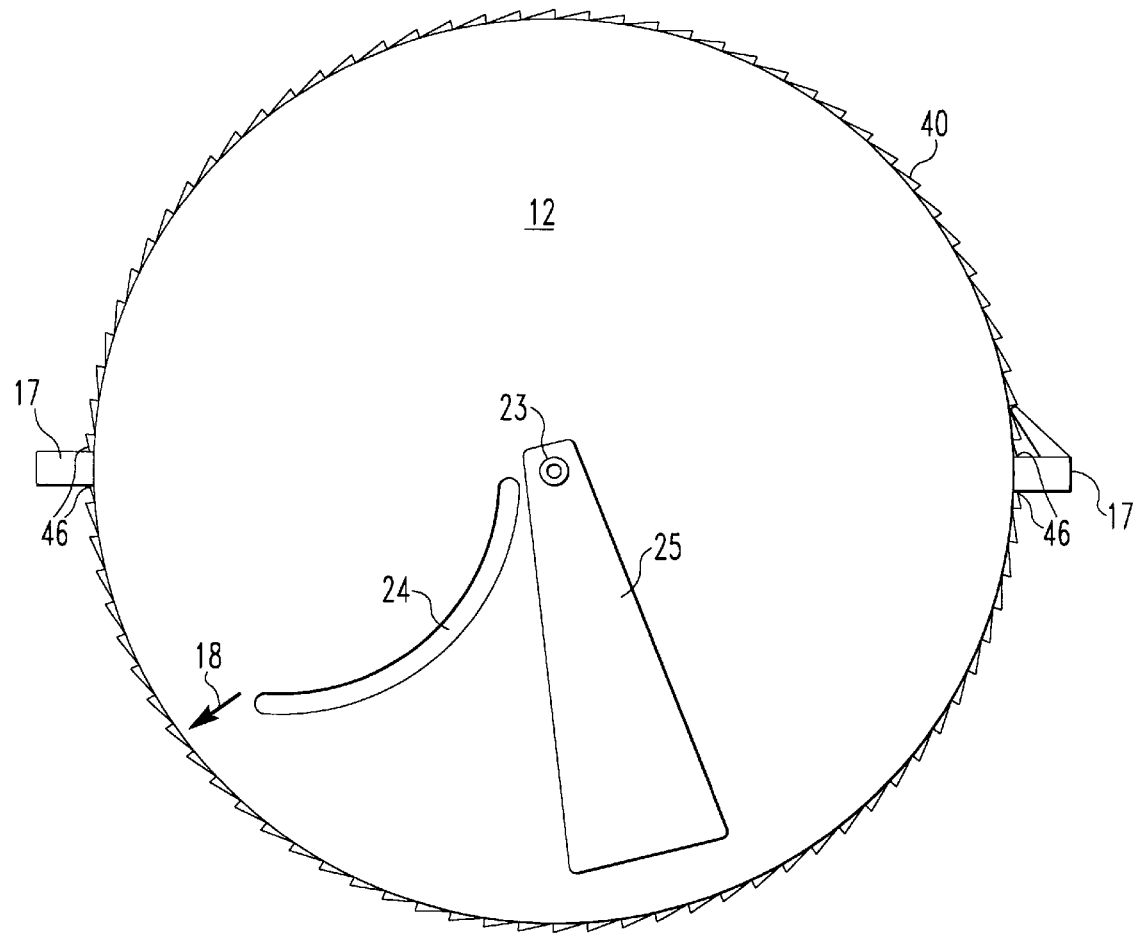
FIG. 4 is a top plan view of the cover depicted in FIG. 3.

Lid 12 is provided with a narrow opening or slot 24 sized to receive one end of a ferrule 28 (FIG. 1) that supports an optical fiber 26 in a connector body 30. The purpose is to clean the end of the optical fiber that is located a short distance from the connector body and is thus exposed for cleaning. The fiber is mounted and held in ferrule 28, which is located in and extends from the forward end of connector body 30. The opening 24 is preferably curved, as shown in FIGS. 2 and 4.

A rotatable cover 25 is shown for closing opening 24 when device 10 is not in use. In this manner, foreign material is prevented from entering the opening and the surface of cleaning layer 22 is kept clean. Cover 25 is shown rotated about an integral post and fastener 23, and secured to lid 12 by the post and fastener.

The operation of cleaning device 10 is as follows. An individual grasps connector body 30 in one hand and inserts the ferrule/fiber end of the body into opening 24 and against cleaning layer 22 located within container 10 while the other hand of the individual grasps extension 16 of cleaning device 10. (If a protective cap is located on the connector body, and thus over the exposed end of fiber 26 and ferrule 28, the cap is, of course, removed from the connector body). The individual then moves the connector body forwardly and in one direction in the slot 24 such that the ferrule/fiber end is translated forwardly in the slot. Moving in one direction prevents return of the fiber end to a soiled area of the cleaning surface. In this manner the fiber end is rubbed against the upper surface of layer 22 under a downward force to clean the fiber end. Elastomer pad 20 deforms under the downward force of the ferrule/fiber end yet provides a force opposed to such a downward force to provide sufficient friction between material 22 and the ferrule/fiber end to effect cleaning of the fiber end.

As the portion of layer 22 located beneath slot 24 becomes soiled from the cleaning process, the user simply rotates lid 12 relative to base 14 or vice versa to expose a clean area of layer 22 for additional cleaning of fiber ends. When the originally clean surface of layer 22 is completely used, which occurs after 360 degree relative rotation of the lid and base, the lid and base are separated, the soiled layer 22 removed from the base, and a clean layer inserted into the base and on pad 20. The lid and base are then placed back together for ready use.

In FIG. 2 of the drawings, the index markings or lines 18 and 15 provided respectively on lid 12 and base 14 show the user of device 10 when complete 360 degree rotation of the cover and base has taken place. A zero and a 360 degree mark can be so labeled so that they can be aligned before relative rotation of the lid and base takes place. With incremental rotation, the zero and 360 incrementally move apart. In this manner, the user knows how much of the surface of layer 22 has been used in the cleaning process. With 360 degree rotation, i.e., when the 360 line reaches (returns to) the zero line, the layer 22 will need to be replaced.

Figure 3:
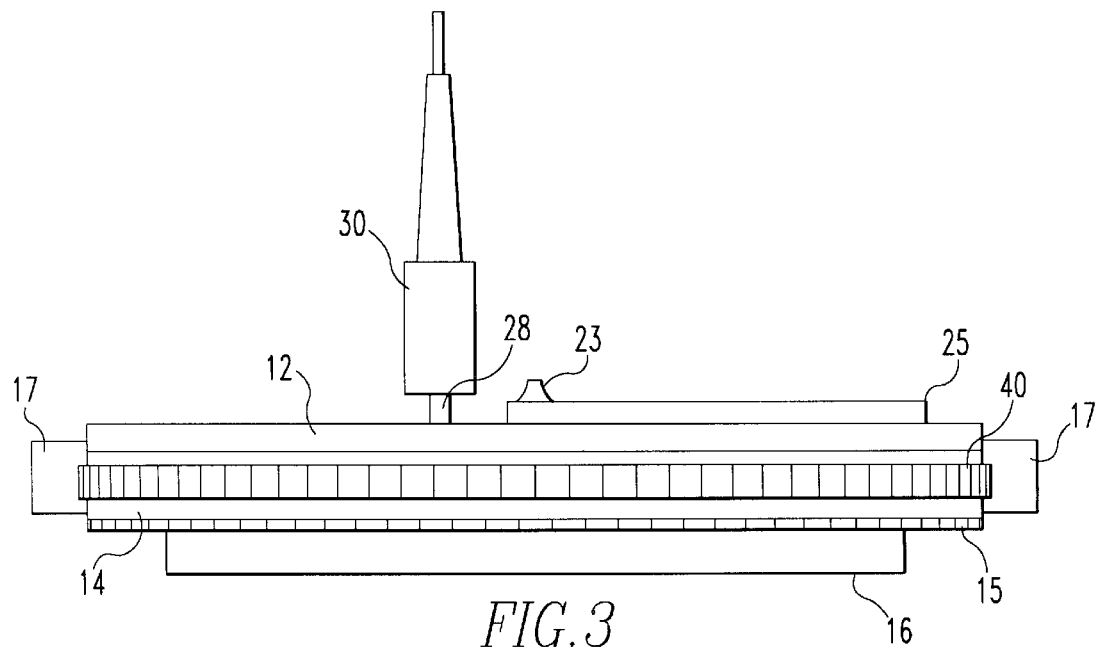
FIG. 3 is a somewhat diagrammatic view of a cover and lid of the cleaning device provided with ratchet teeth that can be employed in using the device.

The base can be provided respectively with peripheral integral teeth 40, as shown somewhat diagrammatically in FIG. 3, and oriented to permit relative rotation of the lid and base in only one direction. This will prevent rotation in the wrong direction so that the user will not lose track of the amount of relative rotation and thus the amount of use of layer 22. Such teeth function as a ratchet when intermeshed, i.e., when the lid and base are placed together. With rotation in one direction, the user can, again, keep track of the degree of rotation so that the cleaning pad can be replaced after 360 degrees of rotation. Teeth 40 face outwardly and engage tabs 17.

As seen in FIG. 1, the teeth 40 of base 14 seat in peripheral slots 45 provided in lid 12 i.e., in tab 17 of lid 12. This retains the base and lid together in assembled relation. In FIG. 4, teeth 40 are shown and are thereby somewhat obscured by the lid beneath lid 12. As further seen in FIG. 4, the teeth are interrupted at opposed locations to receive tabs 17. The interruptions of the teeth provide space 46 for receiving the tabs. When the lid and base are rotated to position the tabs at the locations of the interruptions of the teeth, i.e., at spaces 46, the lid and base can be separated, and can be reassembled in like manner. And, if one of the tabs and teeth spaces 46 is at the beginning of index markings 15 and 18, the user of cleaning device 10 will be able to start the use of the device in a manner that allows him to keep track of clean and soiled areas of cleaning layer 22.

What is claimed is:

1. A device for cleaning an end surface of an optical fiber, comprising:

a circular container containing a circular pad of resilient elastomer material and a circular layer of cleaning material located on the elastomer material, said layer of cleaning material having a surface capable of cleaning an exposed end of an optical fiber when the fiber end surface is rubbed against the surface of the layer of cleaning material, said container including a base and a cover that are relatively manually rotatable when connected together; and said cover having an opening for receiving a fiber end for engaging the surface of the layer of cleaning material.

2. The device of claim 1 wherein the opening in said cover has an arcuate configuration in plan view.

3. The device of claim 1 including indexing means provided on said cover and said base that indicate the amount of relative rotational movement of the cover and the base.

4. The device of claim 1 in which means is provided to permit relative rotation of the lid and the cover in only one direction.

5. A circular container for cleaning an exposed end of an optical fiber located in a supporting ferrule, comprising:

a circular base portion containing a circular elastomer pad and a circular layer of material having a surface for cleaning the exposed end of an optical fiber, a removable cover engaging said base and having an opening for receiving the end of an optical fiber, said cover and base having respective diameters that permit relative rotational movement of the cover and the base, and means providing retention of the cover on said base.

* * * * *